United States Patent [19]

Peter et al.

[11] Patent Number: 5,251,977
[45] Date of Patent: Oct. 12, 1993

[54] APPARATUS FOR PRODUCING RUBBER MIXTURES

[75] Inventors: Julius Peter, Dommayergasse 7/13, A-1130 Vienna, Austria; Günter Weckerle, Northeim, Fed. Rep. of Germany

[73] Assignees: Julius Peter, Vienna, Austria; Continental Aktiengesellschaft, Hanover, Fed. Rep. of Germany; a part interest

[21] Appl. No.: 919,205

[22] Filed: Jul. 24, 1992

[30] Foreign Application Priority Data

Jul. 25, 1991 [DE] Fed. Rep. of Germany ....... 4124600

[51] Int. Cl.⁵ .............................................. B19B 1/06
[52] U.S. Cl. .......................................... 366/91; 366/97
[58] Field of Search ............... 366/76, 77, 14, 91, 366/97, 154, 155, 156, 157, 158, 92, 93, 94, 95, 96, 97; 100/145, 146; 425/202, 208, 209, 200, 205; 220/252, 213

[56] References Cited

U.S. PATENT DOCUMENTS

| | | | |
|---|---|---|---|
| 1,951,872 | 3/1934 | Kalkanis | 425/205 |
| 1,960,030 | 5/1934 | Sackett | 366/155 |
| 3,623,627 | 11/1971 | Bolton | 220/252 |
| 4,269,582 | 5/1981 | Mella | 366/91 |
| 4,910,237 | 3/1990 | Peter | 523/351 |
| 5,011,291 | 4/1991 | Peter | 366/91 |
| 5,096,302 | 3/1992 | Durina | 366/76 |
| 5,108,188 | 4/1992 | Peter et al. | 366/91 |

FOREIGN PATENT DOCUMENTS 0348968 5/1931 United Kingdom ................ 366/195

Primary Examiner—Philip R. Coe
Assistant Examiner—Reginald L. Alexander
Attorney, Agent, or Firm—Robert W. Becker & Associates

[57] ABSTRACT

An apparatus for producing rubber mixtures. A ram kneader that operates in a batch process is provided for producing a master batch. A ram-less kneader for producing a final mixture is disposed below the ram kneader. A chute is disposed between the ram kneader and the ram-less kneader for supplying rubber mixture to the ram-less kneader via an inlet thereof. At least portions of the walls of the chute form closure members that are pivotable downwardly to at least partially close off the inlet of the ram-less kneader.

11 Claims, 1 Drawing Sheet

APPARATUS FOR PRODUCING RUBBER MIXTURES

BACKGROUND OF THE INVENTION

The present invention relates to an apparatus for producing rubber mixtures.

With apparatus of this type, the mixing chamber of a master batcher is emptied after the master batch has been produced. In so doing, the mixture passes via an approximately vertically disposed chute into the mixing chamber of a final mixer, which is embodied as a ramless kneader. Although this kneader is relatively large, with the heretofore known apparatus it was not always possible to prevent a backup of material from developing in the so-called filler wedge or space between the two rotors of the final mixer. The retention times that thereby result for the mixture are disadvantageous with respect to the cooling process and for mixing the reactive materials into the master batch.

It is therefore an object of the present invention to provide an apparatus for producing rubber mixtures that eliminates, or at least considerably reduces, a disadvantageous formation of a so-called wedge or filler space.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figures 1, 2:
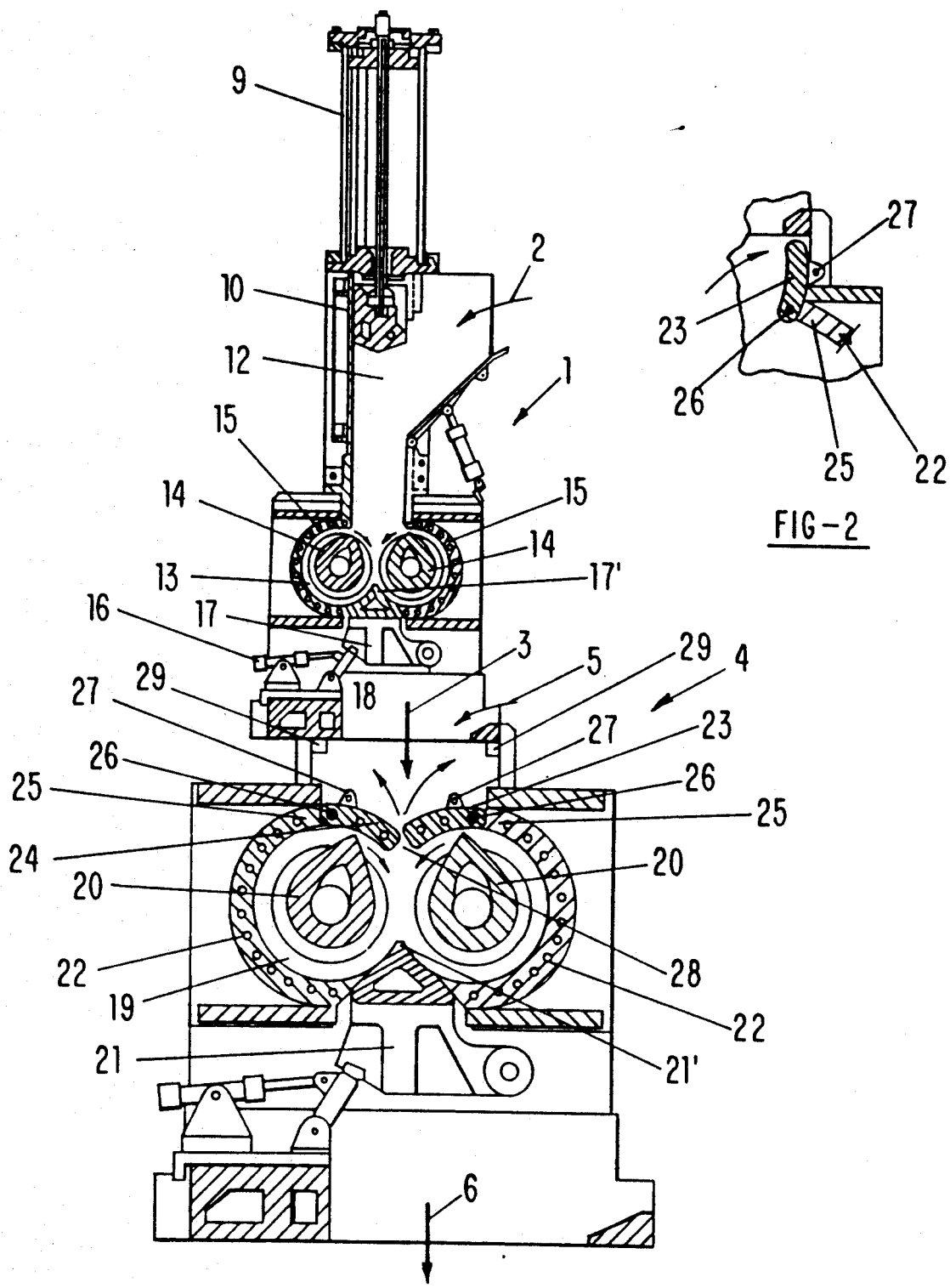
FIG. 1 is a vertical cross-sectional view of one exemplary embodiment of the inventive apparatus for producing rubber mixtures.
FIG. 2 shows a modified embodiment of a portion of the apparatus of FIG. 1.

The apparatus of the present invention is characterized primarily by: for producing a master batch, a ram kneader that operates in a batch process; disposed below said ram kneader, a ram-less kneader for producing a final mixture; and chute means disposed between the ram kneader and the ram-less kneader for supplying rubber mixture to the ram-less kneader via an inlet thereof, with the chute means having walls and with at least portions of these walls forming closure means that are pivotable downwardly to at least partially close off the inlet of the ram-less kneader. It is expedient for those sides of the portions of the chute walls that face the mixing chamber to have a shape that corresponds to the mixing chamber and hence to have a concave shape.

Thus, pursuant to the present invention, the inlet of the final mixer is provided with closure means in the region of the wedge or filler space in order in this way to preclude or at least largely prevent the aforementioned accumulation of material in this region. Furthermore, the chute walls serve a dual function. On the one hand, they delimit the sides of the chute that leads downwardly to the final mixer. On the other hand, by being swung down these walls can fulfill the aforementioned task. It is to be understood that the walls or wall members that are provided for this purpose are provided with a working cylinder in order at the proper time to be able to pivot these members into one or the other operative position.

Portions of oppositely disposed walls of the chute are also advantageously used in order to expediently and symmetrically obtain two flap element halves.

Further specific features of the present invention will be described in detail subsequently.

DESCRIPTION OF PREFERRED EMBODIMENTS

Referring now to the drawing in detail, the ram kneader 1 serves for the production of the master batch, with the constituents for the master batch being supplied to the ram kneader 1 in the direction of the arrow 2. The finished master batch is conveyed to the ram-less kneader 4 in conformity with the arrow 3 by taking advantage of the force of gravity. During the processing of the rubber mixture in the kneader 4, the speed of the kneader is low in order to be able to achieve a rapid cooling. When the critical temperature is reached, the reactive materials are added in conformity with the arrow 5. The finished or final mixture is discharged from the apparatus in the direction of the arrow 6.

The ram kneader 1 is provided at the top with a working cylinder 9 for raising and lowering a press or ram 10 that is disposed in its upper end position for filling or charging the mixing chamber 13. The constituents of the master batch are supplied in the direction of the arrow 2 via a hopper 12. After the materials or constituents have been supplied, the ram 10 is lowered so that the top of the mixing chamber 13, in which are disposed the two rotors 12, can be closed off. The casing parts 15 of the mixing chamber 13 are generally provided with cooling means.

The bottom of the mixing chamber 13 is closed off by a saddle 17 that can be swung away by a working cylinder 16: the top 17' of the saddle 17 projects into the mixing chamber 13. After the master batch has been produced, the mixing chamber 13 is emptied toward the bottom by pivoting or opening the saddle 17. Via the ram-less inlet 18, the master batch passes into the mixing chamber 19, which is also provided with two rotors 20. In comparison to the ram kneader 1, the kneader 4 has a considerably larger mixing chamber 19; in addition, the rotors 20 also operate at a slower speed in order to ensure that the finished master batch can cool off.

After the reactive materials have been added in the direction of the arrow 5, the finished mixture is withdrawn by pivoting the hinged saddle 21, the top of which is indicated by the reference numeral 21', downwardly.

The kneader 4 has the special feature that it is provided in the region of the inlet opening 18, which is normally open for the supply of material, with two closure means or flap-like wall members 23, 24 that are curved slightly in the same manner as are the casing parts 22 of the kneader 4. At the upper edges or ends 25 of the parts 22, the closure means 23, 24 are pivotable by about 90° about a respective horizontal shaft or axis 26, and in particular by means of non-illustrated working cylinders that are connected to eyes 27 disposed on the outside of the closure means 23, 24.

By pivoting the two closure means 23, 24, which are disposed symmetrically relative to the central axis of the kneader 4, upwardly, the inlet 18 is exposed. The closure means 23, 24, which are then disposed approximately vertically upwardly (see FIG. 2), thereby form the side portions of a chute or channel for supplying the mixture to the kneader 4, i.e., they form chute walls. As can be seen in the drawing, the closure means 23, 24 thus serve two functions, namely on the one hand to form a supply chute, and on the other hand to cover or close off the mixing chamber 19. In the position illustrated in FIG. 1, the closure means 23, 24 prevent the undesired accumulation of rubber mixture in the so-called filler space or wedge. For this reason, the closure means 23, 24 also extend into the space between the two rotors 20, as indicated by the reference numeral 28.

In the vertical or upright position, the two closure means 23, 24 rest at the top against abutment or stop means 29.

It is to be understood that the working cylinders that are connected to the eyes 27 fix and block the closure means 23, 24 in the two end positions, in other words hold the closure means in position. Furthermore, it must be ensured that the closure means 23, 24 assume the position shown in FIG. 1 only when the mixing process is being carried out.

It should also be noted that if sufficient space is available, a single-piece wall member or closure means can be used; such a closure means must also be pivotable, and must extend over the entire width of the inlet 18.

Not only the two casing parts 22 but also the two closure means or wall members 23, 24 are expediently provided with cooling means, for example in the form of the aforementioned cooling channels.

Whereas in FIG. 1 the chute walls 23, 24 are pivoted downwardly, in the embodiment illustrated in FIG. 2 these walls are pivoted up, with those surfaces of the chute wall 23, 24 that face one another forming the inner surface of the chute. In contrast to the embodiment illustrated in FIG. 1, in FIG. 2 the chute walls 23, 24 do not rest against stop means 29, but rather rest against appropriately shaped portions of the frame of the machine and of the casing parts 22. A further important point in this connection is that for the symmetrically disposed chute walls 23, 24, the distance between their axes 26 is such that the distance of the facing surfaces (inner surfaces) of the two closure means 23, 24 from one another is at least as great as the distance between the axes of rotation of the two rotors 20. Furthermore, this distance can be of such a magnitude that it is up to 1.25 times greater than the distance between the axes of the rotors 20. (With this arrangement of the two chute walls, it is presumed that the inlet opening 18 is disposed centrally over the two rotors 20.)

The present invention is, of course, in no way restricted to the specific disclosure of the specification and drawing, but also encompasses any modifications within the scope of the appended claims.

What we claim is:

1. An apparatus for producing rubber mixtures, comprising:

for producing a master batch, a ram kneader that operates in a batch process;

disposed below said ram kneader, a ram-less kneader for producing a final mixture, with said ram-less kneader having two rotors with parallel axes of rotation; and chute means disposed between said ram kneader and said ram-less kneader for supplying rubber mixture to said ram-less kneader via an inlet thereof, with said chute means having walls and with at least portions of said walls forming closure means that are pivotable between an upwardly pivoted position to expose said inlet of said ram-less kneader and a downwardly pivoted position to at least partially close off said inlet of said ram-less kneader, wherein in a downwardly pivoted state, said portions of said walls of said chute means extend into a space provided between said two rotors of said ram-less kneader, and wherein said portions of said walls of said chute means are pivotable about horizontal axes that extend parallel to said axes of rotation of said rotors of said ram-less kneader.

2. An apparatus according to claim 1, wherein said ram-less kneader has a mixing chamber defined by casing parts, and wherein surfaces of said portions of said walls of said chute means that face said mixing chamber conform to an inner contour of said casing parts.

3. An apparatus according to claim 2, wherein inner surfaces of said casing parts and of said portions of said walls of said chute means merge with one another in an essentially stepless manner with an essentially identical curvature.

4. An apparatus according to claim 1, wherein said portions of said walls of said chute means comprise two members that are mounted on opposite locations of said ram-less kneader and are disposed symmetrically relative to a central axis of said ram-less kneader.

5. An apparatus according to claim 1, wherein said portions of said walls of said chute means are pivotable by about 90°.

6. An apparatus according to claim 1, wherein working cylinders are provided to effect pivoting of said portions of said walls of said chute means.

7. An apparatus according to claim 6, wherein said working cylinders also serve to fix said portions of said walls of said chute means in end positions thereof.

8. An apparatus according to claim 1, wherein stop means are provided and wherein said portions of said walls of said chute means, in a chute-forming position thereof, rest against said stop means.

9. An apparatus according to claim 1, wherein said portions of said walls of said chute means extend into said space between said rotors to such an extent that said portions practically eliminate any accumulation of rubber mixture between said rotors.

10. An apparatus according to claim 1, wherein said portions of said walls of said chute means comprise two members having respective pivot axes that are spaced from one another such that when said two members are pivoted upwardly, facing surfaces of said members are spaced from one another by a distance that is in a range of from being equal to to up to 1.25 times greater than a distance between axes of rotation of rotors of said ram-less kneader.

11. An apparatus according to claim 1, wherein said portions of said walls of said chute means are mounted to said ram-less kneader in the vicinity of said inlet thereof.

* * * * *